(12) United States Patent
Ghorbal et al.

(10) Patent No.: US 8,719,790 B2
(45) Date of Patent: May 6, 2014

(54) DONUT DOMAINS—EFFICIENT NON-CONVEX DOMAINS FOR ABSTRACT INTERPRETATION

(75) Inventors: Khalil Ghorbal, Princeton, NJ (US); Franjo Ivancic, Princeton, NJ (US); Gogul Balakrishnan, Princeton, NJ (US); Naoto Maeda, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 63 days.

(21) Appl. No.: 13/428,608

(22) Filed: Mar. 23, 2012

(65) Prior Publication Data
US 2012/0246626 A1 Sep. 27, 2012

Related U.S. Application Data

(60) Provisional application No. 61/466,522, filed on Mar. 23, 2011.

(51) Int. Cl.
*G06F 9/44* (2006.01)
*H04N 5/33* (2006.01)
*G06F 17/30* (2006.01)

(52) U.S. Cl.
USPC ........... 717/124; 717/132; 717/151; 348/164; 707/714

(58) Field of Classification Search
None
See application file for complete search history.

(56) References Cited

U.S. PATENT DOCUMENTS

| 5,802,525 | A | * | 9/1998 | Rigoutsos | 707/103 |
| 7,806,825 | B2 | * | 10/2010 | Heim | 600/453 |
| 2006/0236311 | A1 | * | 10/2006 | Chang et al. | 717/151 |
| 2007/0245329 | A1 | * | 10/2007 | Sankaranarayanan et al. | 717/151 |
| 2008/0016497 | A1 | * | 1/2008 | Wang et al. | 717/124 |
| 2011/0292216 | A1 | * | 12/2011 | Fergus et al. | 348/164 |

OTHER PUBLICATIONS

Khalil Ghorbal, Franjo Ivan, Gogul Balakrishnan, Naoto Maeda, and Aarti Gupta; Donut Domains: Efficient Non-convex Domains for Abstract Interpretation, NEC Laboratories America, Inc., NEC Corporation, Kanagawa 211-8666, Japan, Jan. 2012.*

* cited by examiner

*Primary Examiner* — Don Wong
*Assistant Examiner* — Mohammad Kabir
(74) *Attorney, Agent, or Firm* — Joseph Kolodka (57) ABSTRACT

A computer implemented program analysis method employing a set of new abstract domains applicable to non-convex invarients. The method analyzes programs statically using abstract interpretation while advantageously considering non-convex structures and in particular those situations in which an internal region of an unreachable state exists within a larger region of reachable states. The method employs a new set of non-convex domains (donut domains) based upon the notion of an outer convex region of reachable states (Domain D1) and an inner region of unreachable states (Domain D2) which advantageously permits capture of non-convex properties by using convex regions and operations.

15 Claims, 10 Drawing Sheets

```
static void p_line16_primary (...) {
    double dx, dy, x, y, slope;
    ...
    if (dx == 0.0 && dy == 0.0)    /* full-zero-test */
        return;
    if (fabs(dy) > fabs(dx)) {     /* fabs-based test */
        slope = dx / dy;           /* division-by-dy */
        ...
    } else {
        slope = dy / dx;           /* division-by-dx */
        ...
    }
}
```

DONUT DOMAINS—EFFICIENT NON-CONVEX DOMAINS FOR ABSTRACT INTERPRETATION

CROSS REFERENCE TO RELATED APPLICATION

This application claims the benefit of U.S. Provisional Patent Application Ser. No. 61/466,522 filed Mar. 23, 2011 which is incorporated by reference as if set forth at length herein.

TECHNICAL FIELD

This disclosure relates generally to the field of computer software and in particular to a method of program analysis using abstract interpretation which advantageously expresses non-convex properties.

BACKGROUND

Efficient program analysis using abstract interpretation typically uses convex domains such as intervals, octagons, zonotopes or polyhedral. However, certain properties of interest require reasoning about non-convex structures. Accordingly, program analysis methods that address these non-convex structures would represent an advance in the art.

SUMMARY

An advance in the art is made according to an aspect of the present disclosure directed a computer implemented method of program analysis employing a set of new non-convex domains based on the notion of an outer convex region of reachable states and an inner region of unreachable states. Advantageously, this allows the capture of non-convex properties by reasoning completely using convex regions and operations.

In sharp contrast to the prior art, methods according to the present disclosure will over-approximate reachable states of a program under analysis and under-approximate unreachable states of that program. In that manner, a more precise analysis is performed.

BRIEF DESCRIPTION OF THE DRAWING

A more complete understanding of the present disclosure may be realized by reference to the accompanying drawings in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that prior approach to non-convex reasoning is to utilize powerset domains of elementary convex domains. In general, it has proved to be difficult to provide satisfactory improvements over elementary convex domains with powerset domains while maintaining small enough performance degradation. Furthermore, it would be difficult to maintain enough disjunctions in the powerset depending on the particular non-convex shape being approximated. Note, however, that the recently proposed BOXES domain can potentially represent exponentially many interval constraints compactly. It utilizes a BDD-like extension to elementary range constraints called LDD. However, we are interested in relational domains such as octagons, zonotopes or polyhedra as well.

Additional non-convex domains based on congruence analysis (either linear or trapezoid have been developed. Such domains capture a congruence relation that variables satisfy and are suitable for the analysis of indexes of arrays for instance. Recent work by Chen et al. considered a polyhedral abstract domain with interval coefficients. This abstract domain has the ability to express certain non-convex invariants. For example, in this domain some multiplications can be evaluated precisely. Other interesting non-convex abstract domains were introduced to capture specific invariants such as min-max invariants and quadratic templates.

We address a different type of non-convexity commonly occurring in software, which relates to small sub-regions of instability within a normal operating (convex) region of interest. The non-convex region of values that may cause the bug is (under-)approximated using a convex inner region (or hole) that is subtracted from a convex outer region. We call this representation donut domains. Our approach relies on the usual operations defined on (convex) sub-domains, except for the need to compute under-approximations in the inner domain. The donut domains give a convenient framework to reason about disequality constraints in abstract domains such as in. It can be considered as a generalization of the work on signed types domain introduced in. There, we start with a finite set of types, and allow a set-minus operation only from the universal set.

Under-Approximations of Polyhedral

Under-approximations have been utilized for applications such as test vector generation and counterexample generation, by providing must-reach sets. Bemporad et al. introduced the notion of inner-approximations of polyhedra using intervals in. In, polyhedra are under-approximated for test vector generation of Simulink/Stateflow models using a bounded vertex representation (BVR). Goubault and Putot describe a method to compute an under-approximating zonotope using modal intervals for non-linear operations.

Herein, we describe a technique to find under-approximations of polyhedra based on a fixed template. We first re-formulate the problem by introducing an auxiliary matrix. This matrix represents the fact that we are looking for an inner polyhedral object of a particular shape. Using this auxiliary matrix re-formulation, we can then use standard convex analysis techniques to characterize an under-approximations of polyhedra.

Motivating Example

Figure 1:
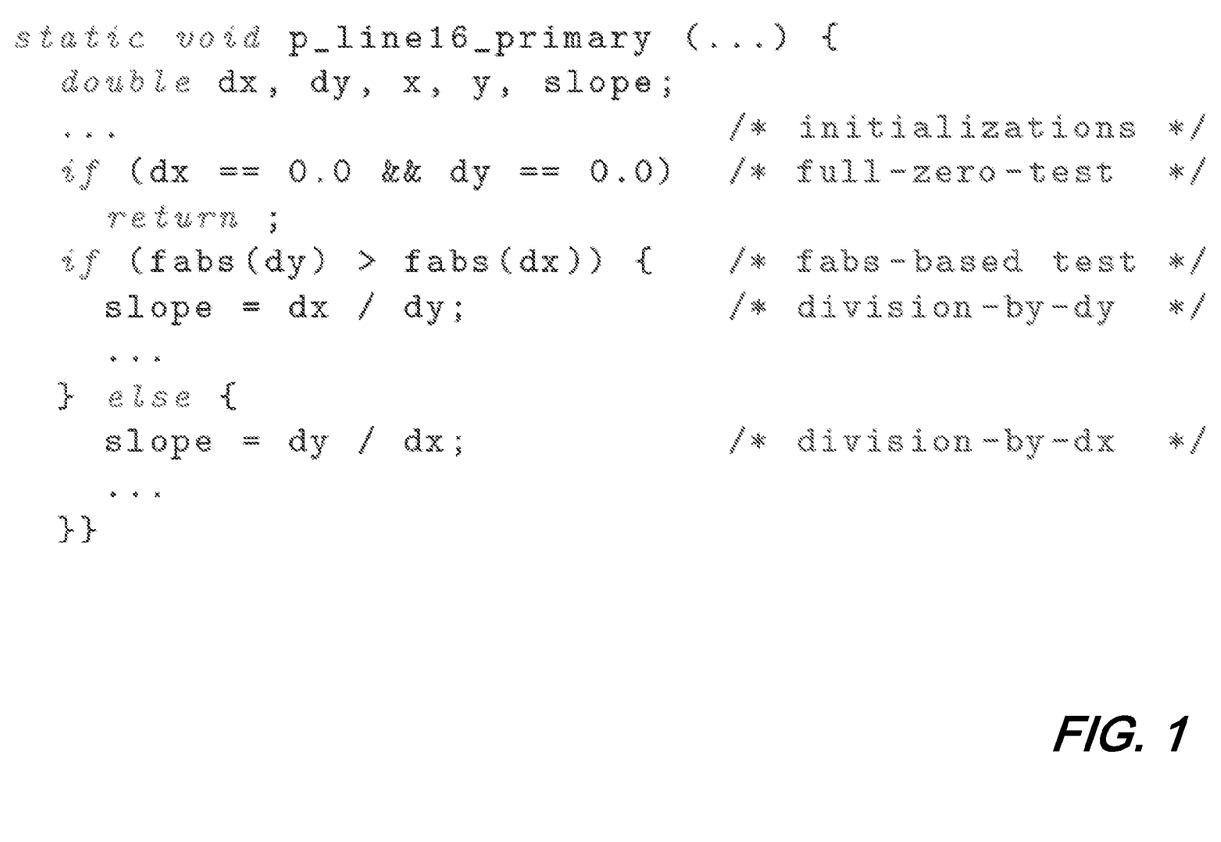
FIG. 1 shows a program excerpt providing a motivating example according to an aspect of the present disclosure.

FIG. 1 highlights a code snippet taken froth XTIDE. The XTIDE package provides accurate tide and current predictions in a number of formats based on algorithms. Similar patterns may exist in controller-related software to avoid regions of controller or numerical instability.

After the step marked initializations, (dx, dy) could be any point in $\mathbb{R}^2$ except the origin (0,0). In our analysis, this particular point is kept and propagated forward as a "hole".

After the i f-statement, the set of reachable values is: (dy>dx ∧ dy>−dx) ∨ (−dy>dx ∧ −dy>−dx). The above region is non-convex; therefore, a classical abstract domain will end up at this control point with T for both variables. Moreover, here, the interpretation of the strict inequality of the test is required to prove that dx≠0. The else case is even harder: in addition to the non-convexity of the set of possible values, one needs to consider the full-zero-test together with the negation of |dy|>|dx|, to prove that the division by dy is safe.

Donut Abstract Domains

In this section we introduce donut domains, and define the operation on donut domains based on operations in the component domains.

Lattice Structure

Let $(\mathcal{A}_1, \leq_1, \cup_1, \cap_1, \perp_1, T_1, \gamma_1)$ and $(\mathcal{A}_2, \leq_2, \cup_2, \cap_2, \perp_2, T_2, \gamma_2)$ denote two classical numerical abstract domains, where $\leq_\star, \cup_\star, \cap_\star, \perp_\star, T^*, \gamma_\star$ denote the partial order, the join and meet operations, the bottom and top elements and the concretization function of the classical abstract domain for $\star \in \{1,2\}$, respectively.

In this disclosure, we extend a given abstract domain with an under-approximation operator $\breve{\alpha}$, such that for any concrete object X, we have $\gamma \circ \breve{\alpha}(X) \subseteq X$. An abstract object $X_{1\backslash 2}^{\#}$ of the domain $\mathcal{A}_1 \backslash \mathcal{A}_2$ is defined by a pair of objects $(X_1^{\#}, X_2^{\#})$, such that $X_1^{\#} \in \mathcal{A}_1$ an $X_2^{\#} \in \mathcal{A}_2$. The object $X_{1\backslash 2}^{\#}$ abstracts the set of possible values reached by the variables as follows:

The object $X_1^{\#} \in \mathcal{A}_1$ represents an over-approximation of the set of reachable values; and The object $X_2^{\#} \in \mathcal{A}_2$ represents an under-approximation of the set of unreachable values (usually within $\gamma_1(X_1^{\#})$).

The concretization function is defined as follows.

$$\gamma_{1\backslash 2} \stackrel{def}{=} \gamma_{1\backslash 2}(X_1^{\#}, X_2^{\#}) \stackrel{def}{=} \gamma_1(X_1^{\#}) \backslash \gamma_2(X_2^{\#}).$$

Figure 2:
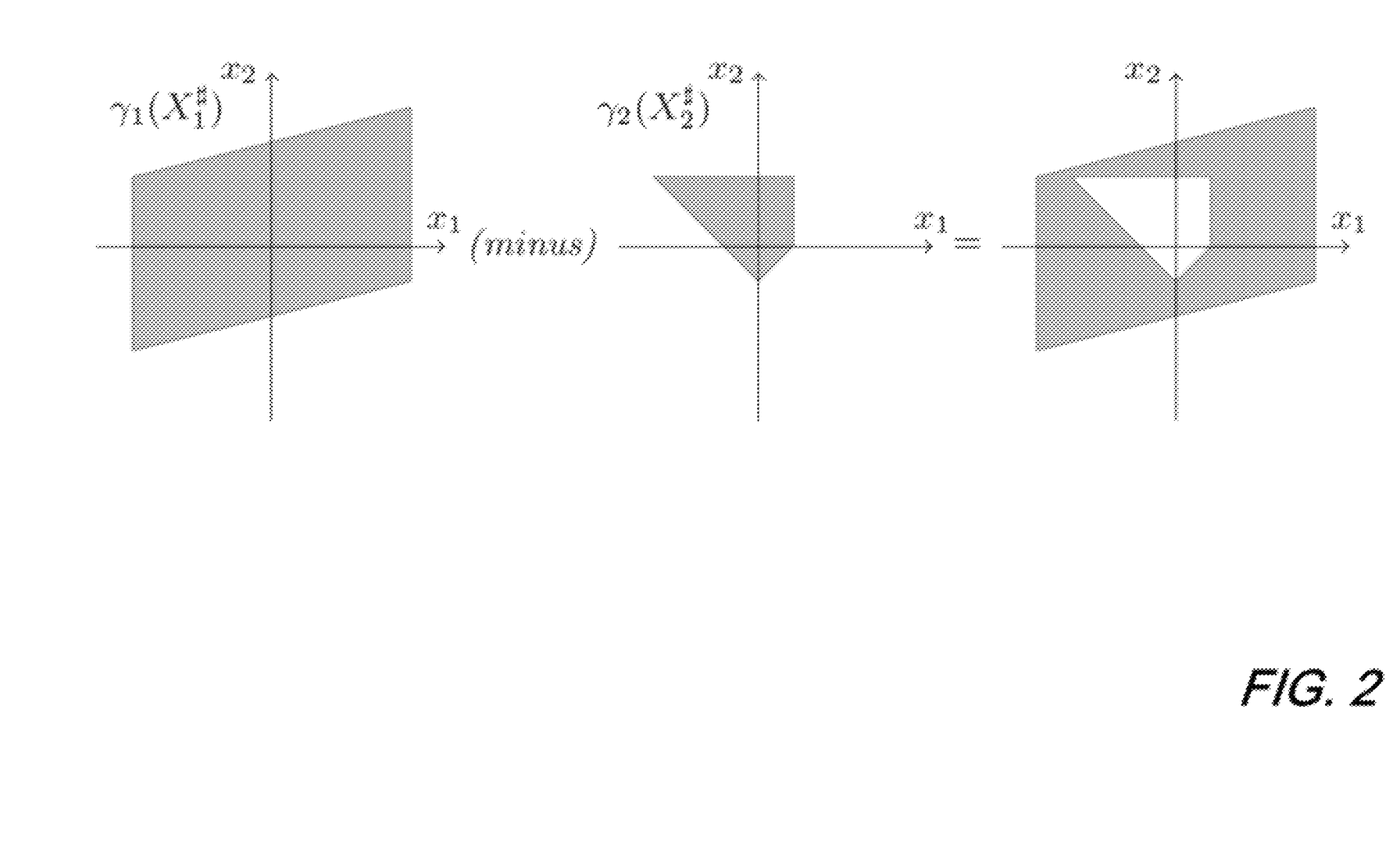
FIG. 2 is a schematic diagram depicting the concretization of a typical non-convex abstract object according to an aspect of the present disclosure.

FIG. 2 depicts a concretization of a typical donut object where the domain $\mathcal{A}_1$ is the affine sets domain and $\mathcal{A}_2$ is the octagons domain.

At this point, one should keep in mind the implicit set of unreachable values implied by $\gamma_1(X_1^{\#})$—namely $\mathbb{R}^P \backslash \gamma_1(X_1^{\#})$ denoted in the sequel by $\bar{\gamma}_1(X_1^{\#})$. Indeed, the set of unreachable values is actually $\bar{\gamma}_{X1}^{\#}) \cup \gamma_2(X_2^{\#})$. As said earlier, $\gamma_2(X_2^{\#})$ is a (convex) under-approximation of the set of unreachable values. The fact that the intersection $\gamma_1(X_1^{\#}) \cap \gamma_2(X_2^{\#})$ is not empty permits to encode a hole inside $\gamma_1(X_1^{\#})$ (see FIG. 2).

Interval Concretization

The interval concretization of the variable $x_k$, $1 \leq k \leq p$, denoted by $[x_k]$, is defined by $\pi_k(\gamma_1(X_1^{\#}) \backslash \gamma_2(X_2^{\#}))$, where $\pi_k$ denotes the orthogonal projection of a given set onto dimension k. Note that $[x_k] \supset \pi_k(\gamma_1(X_1^{\#})) \backslash \pi_k(\gamma_2(X_2^{\#}))$. For instance in $([-2,2]\times[-2,2], [-\overline{1,1}]\times[-28, +\infty])$, we have $[x_2]=[-2,2]$, whereas $[-2,2] \backslash [-\infty, +\infty]=\emptyset$.

We embed $\mathcal{A}_1 \backslash \mathcal{A}_2$ with a binary relation and prove that it is a pre-order.

Definition 1. Given $X_1^{\#}, Y_1^{\#} \in \mathcal{A}_1$ and $X_2^{\#}, Y_2^{\#} \in \mathcal{A}_2$, we say that $(X_1^{\#}, X_2^{\#})$ is less than or equal to $(Y_1^{\#}, Y_2^{\#})$ denoted by $(X_1^{\#}, X_2^{\#}) \leq_{1\backslash 2} (Y_1^{\#}, Y_2^{\#})$ if and only if $X_1^{\#} \leq_1 Y_1^{\#}$ and $$\bar{\gamma}_1(X_1^{\#}) \cup \gamma_2(X_2^{\#}) \supseteq \bar{\gamma}_1(Y_1^{\#}) \cup \gamma_2(Y_2^{\#}). \qquad (1)$$

Proposition 1. The binary relation $\leq_{1\backslash 2}$ is a pre-order over $\mathcal{A}_1 \backslash \mathcal{A}_2$. It defines an equivalence relation ~ defined by $(X_1^{\#}, X_2^{\#}) \leq_{1\backslash 2} (Y_1^{\#}, Y_2^{\#})$ and $(Y_1^{\#}, Y_2^{\#}) \leq_{1\backslash 2} (X_1^{\#}, X_2^{\#})$ and characterized by $X_1^{\#}=Y_1^{\#}(X_1^{\#} \leq_1 Y_1^{\#}$ and $Y_1^{\#} \leq_1 X_1^{\#})$, $\gamma_2(X_2^{\#})$ $\subseteq \gamma_2(Y_2^{\#}) \cup \overline{\gamma}_1(Y_1^{\#})$ and $\gamma_2(Y_2^{\#}) \subseteq \gamma_2(X_2^{\#} \cup \overline{\gamma}_1(X_1^{\#})$. We reuse the symbol $\leq_{1\backslash 2}$ to also denote the partial order quotiented by the equivalence relation $\sim$.

With respect to $\leq_{1\backslash 2}$, we have $$(\perp_1, \perp_2) \sim (\perp_1, T_2) \leq_{1\backslash 2} (T_1, T_2) \leq_{1\backslash 2} (T_1, \perp_2);$$

therefore, we define the bottom and top elements of $\mathcal{A}_1 \backslash \mathcal{A}_2$ by $$\perp_{1\backslash 2} \mathrm{def} = (\perp_1, -) \; T_{1\backslash 2} \mathrm{def} = (T_1, \perp_2).$$

Decidability of the Order

Despite the non-convexity of $\overline{\gamma}$, the equivalence class introduced in Proposition 1 suggests particular representatives of objects $(X_1^{\#}, X_2^{\#})$ which are easily comparable. Indeed, $\overline{y}$ is no longer involved when the concretization of the hole $X_2^{\#}$ is included in the concretization of $X_1^{\#}$. Moreover, observe that the definition of the order relation $\leq_{1\backslash 2}$ allows comparing two abstract objects having their holes in two different abstract domains, since only the concretization functions are involved in (1).

Proposition 2. Let $(X_1^{\#}, X_2^{\#})$ and $(Y_1^{\#}, Y_2^{\#})$ be two elements of $\mathcal{A}_1 \backslash \mathcal{A}_2$ such that $\gamma_2(X_2^{\#}) \subseteq \gamma_1(X_1^{\#})$, and $\gamma_2(Y_2^{\#}) \subseteq \gamma_1(Y_1^{\#})$. Therefore, $(X_1^{\#}, X_2^{\#}) \leq_{1\backslash 2} (Y_1^{\#}, Y_2^{\#})$ if and only if $X_1^{\#} \leq_1 Y_1^{\#}$ and $\gamma_1(X_1^{\#}) \cap \gamma_2(Y_2^{\#}) \subseteq \gamma_2(X_2^{\#})$.

The condition $\gamma_1(X_1^{\#}) \cap \gamma_2(Y_2^{\#}) \subseteq \gamma_2(X_2^{\#})$, can be checked in the abstract world rather than in the concrete domain up to the use of an expressive enough domain for both $\mathcal{A}_{12}$ and $\mathcal{A}_1$: for instance a box and an octagon can be seen as special polyhedra and the meet operation of the Polyhedra abstract domain can be used.

Let $X_1^{\mathcal{P}}$ denote the abstract representation in the Polyhedra domain of the abstract object $X_1^{\#}$, that is $\alpha_{\mathcal{P}}(\gamma_1(X_1^{\#}))$. To decide whether $(X_1^{\#}, X_2^{\#})$ is less than or equal to $(Y_1^{\#}, Y_2^{\#})$, we proceed as follows:

1. First, we "upgrade" $X_2^{\#}$ and $Y_2^{\#}$ to the Polyhedra domain. We denote by $(X_1^{\#}, X_2^{\mathcal{P}})$ and $(Y_1^{\#}, Y_2^{\mathcal{P}})$ the newly obtained abstract objects.
2. Then, we derive our particular representatives, namely $(X_1^{\#}, X_1^{\mathcal{P}} \cap_p X_2^{\mathcal{P}})$ for $(X_1^{\#}, X_2^{\mathcal{P}})$ and $(Y_1^{\#}, Y_2^{\mathcal{P}} \cap_{\mathcal{P}} Y_2^{\mathcal{P}})$ for $(Y_1^{\#}, Y_2^{\mathcal{P}})$ ($\cap_p$ being the meet operation in the Polyhedra domain).
3. Finally, we use Proposition 2 by checking for the inequalities $X_1^{\#} \leq_1 Y_1^{\#}$ and $X_1^{\mathcal{P}} \cap_{\mathcal{P}} Y_1^{\mathcal{P}} \cap_{\mathcal{P}} Y_2^{\mathcal{P}} \leq_{\mathcal{P}} X_1^{\mathcal{P}} \cap_{\mathcal{P}} X_2^{\mathcal{P}}$ Meet and Join Operations We start with a simple example to clarify the intuition behind the formal definition given later.

EXAMPLE 1

Consider a one-dimensional donut domain where $\mathcal{A}_1$ and $\mathcal{A}_2$ are Intervals domains. Assume we are interested in computing $$([0,3] \backslash [1,2]) \cup ([1,6] \backslash [2,5]).$$

The above join yields the following union of four intervals: $[0,1) \cup (2,3] \cup [1,2) \cup (5,6]$, which can be combined without loss of precision into $[0,2) \cup (2,3] \cup (5,6]$, or equivalently $$[0,6] \backslash (\{2\} \cup (3,5]).$$

What the example suggests is that when computing a join of two elements $(X_1^{\#}, X_2^{\#})$ and $(Y_1^{\#}, Y_2^{\#})$, we often end up with multiple (not necessarily convex nor connex) holes defined by $(\gamma_2(X_2^{\#}) \cup \overline{\gamma}_1(X_1^{\#})) \cap (\gamma_2(Y_2^{\#}) \cup \overline{\gamma}_1(Y_1^{\#}))$. By distributing the meet over the join, we obtain:

$$(\gamma_2(X_2^{\#}) \cap \gamma_2(Y_2^{\#})) \cup (\gamma_2(X_2^{\#}) \cap \overline{\gamma}_1(Y^{\#})) \cup (\gamma_2(Y_2^{\#}) \cap \overline{\gamma}_1(X_1^{\#})) \cup (\overline{\gamma}_1(X_1^{\#}) \cap \overline{\gamma}_1(Y_1^{\#})).$$

An under-approximation of the final element $\overline{\gamma}_1(X_1^{\#}) \cap \overline{\gamma}_1(Y_1^{\#})$ is implicit since the over-approximation of reachable values is given by $X_1^{\#} \cup_1 Y_1^{\#}$. Thus, only the intersection of the first Three sets will be considered (which is sound). In our example, $\overline{\gamma}([1,6]) = [-\infty, 1) \cup (6, +\infty]$, and $\overline{\gamma}([0,3]) = [-\infty, 0) \cup (3, +\infty]$, this gives $[1,2] \cap [2,5] = [2,2]$ and $$[1,2] \cup ([-\infty, 1) \cup (6, +\infty]) = \emptyset$$

$$[2,5] \cap ([-\infty, 0) \cup (3, +\infty]) = (3,5].$$

As noted previously, the intersection $([-\infty, 1) \cup (6, +\infty]) \cap ([-\infty, 0) \cup (3, +\infty])$ is implicit since it is covered by $\overline{\gamma}_1([0,3] \cup [1,6])$. We now formalize the join operator:

$$(X_1^{\#}, X_2^{\#}) \cup_{1\backslash 2} (Y_1^{\#}, Y_2^{\#}) \stackrel{def}{=} \left( X_1^{\#} \cup_1 Y_1^{\#}, (X_1^{\#}, X_2^{\#}) \widetilde{\cap} (Y_1^{\#}, Y_2^{\#}) \right),$$

where $\widetilde{\cap}$ is defined by:

$$(X_1^{\natural}, X_2^{\natural}) \widetilde{\cap} (Y_1^{\natural}, Y_2^{\natural}) \stackrel{def}{=}$$

$$\breve{\alpha} \left( (\gamma_2(X_2^{\natural}) \cap \gamma_2(Y_2^{\natural})) \cup (\gamma_2(X_2^{\natural}) \cap \overline{\gamma}_1(Y_1^{\natural})) \cup (\gamma_2(Y_2^{\natural}) \cap \overline{\gamma}_1(X_1^{\natural})) \right).$$

We may perform heuristic checks to prioritize which hole (if many) to keep, which may also depend on the under-approximation abstraction function $\breve{\alpha}$. For instance we may choose an inner approximation (if working with closed domains) of the hole $(3,5]$ instead of choosing the hole $[2,2]$. Notice also that we have a straightforward fallback operator $\widetilde{\cap}_{fb}$, that involves only $X_2^{\#}$ and $Y_2^{\#}$:

$$X_2^{\natural} \widetilde{\cap}_{fb} Y_2^{\natural} \stackrel{def}{=} \breve{\alpha}(\gamma_2(X_2^{\natural}) \cap \gamma_2(Y_2^{\natural})).$$

Figure 3:
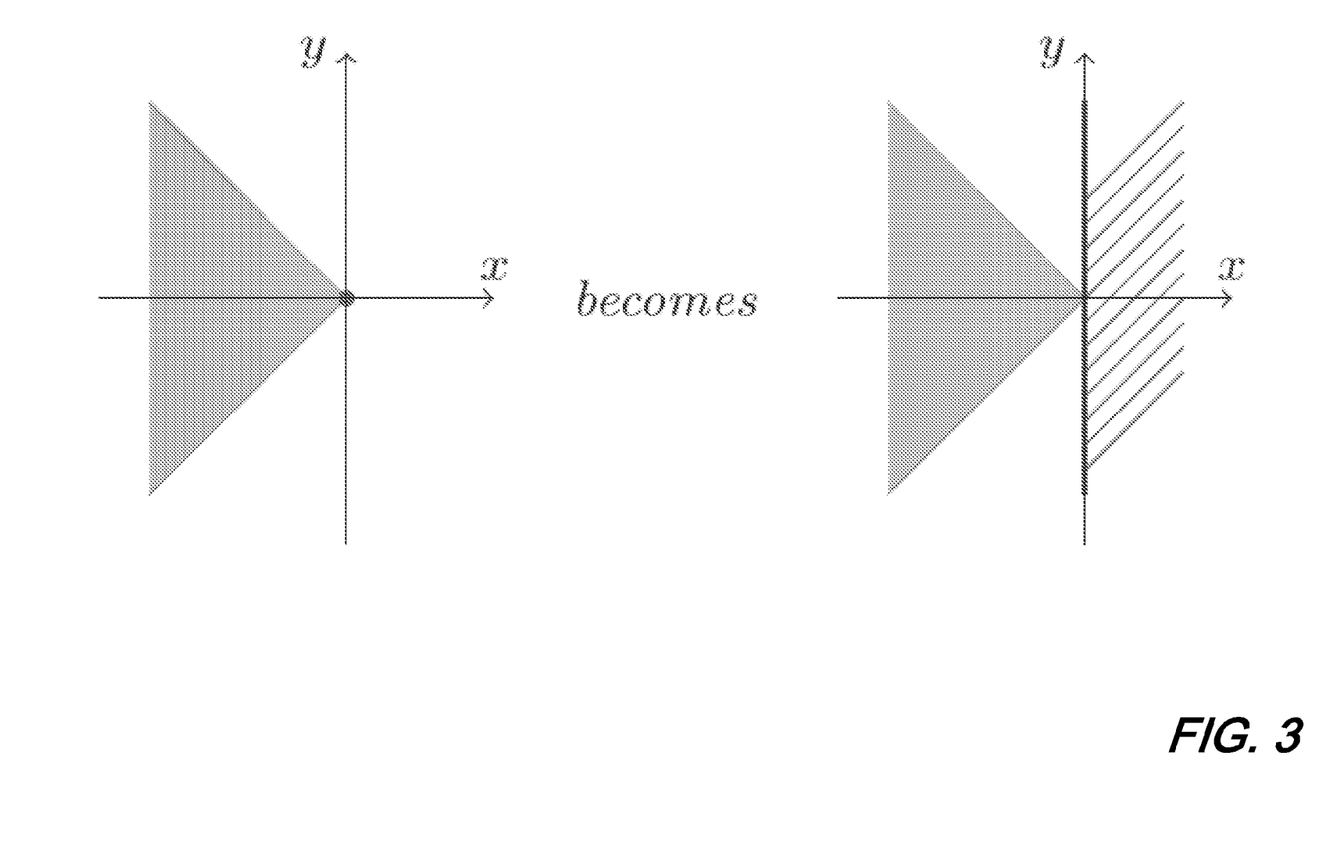
FIG. 3 is a schematic diagram depicting the relaxation of the hole (0,0) to x≥0 according to an aspect of the present disclosure.

The operator is sound with respect to under-approximation. It focuses only on a particular hole, namely $\gamma_2(X_2^{\#}) \cap \gamma_2(Y_2^{\#})$, instead of considering all possibilities. In our current implementation, we use this fallback operator in a smart manner: before computing the meet of both holes, we relax, whenever possible, in a convex way, these holes. This relaxation is performed by removing all constraints that could be removed while preserving $\gamma_1(X_1^{\#})$. For instance, if the hole is the point $(0,0)$, and the abstraction of $X_1^{\#}$ is given by the conjunction $y \geq \Lambda - y \geq x$, then the hole $(0,0)$ is relaxed to $x \geq 0$ (see FIG. 3).

For the meet operation, we proceed in a similar manner. If the domain $\mathcal{A}_2$ is closed under the meet operation (almost all polyhedra-like abstract domains), it is possible to replace $\breve{\alpha}$ by $\alpha$, and $\widetilde{\cap}_{fb}$ by $\cap_2$. In our example, the fallback operator gives the box $[2,2]$.

The meet operator $\cap_{1\backslash 2}$ is defined in a similar manner:

$$(X_1^{\natural}, X_2^{\natural}) \cap_{1\backslash 2} (Y_1^{\natural}, Y_2^{\natural}) \stackrel{def}{=} (X_1^{\natural} \cap_1 Y_1^{\natural}, X_2^{\natural} \widetilde{\cup} Y_2^{\natural}) \text{ where}$$

$$X_2^{\natural} \widetilde{\cup} Y_2^{\natural} \stackrel{def}{=} \breve{\alpha}_2(\gamma_2(X_2^{\natural}) \cup \gamma_2(Y_2^{\natural})).$$

We deliberately omit $\overline{\gamma}_1(X_1^{\#}) \cup \overline{\gamma}_1(Y_1^{\#})$ in the above definition of $\widetilde{\cup}$ because it is implicit from $X_1^{\#} \cap_1 Y_1^{\#}$. If the domain $\mathcal{A}_2$ is closed under the join operation, then $\widetilde{\cup}$ is exactly equal to $\cup_2$. Very often, however, the join operation leads to an over-approximation. Therefore the detection of an exact join as in is of particular interest. In our current implementation, if $X_2^\#$ and $Y_2^\#$ overlap, we soundly extend, in a convex way, the non-empty intersection. For instance, if $X_2^\# = [-2,1] \times [-1,1]$ and $Y_2^\# = [-1,2] \times [-2,0]$, the intersection gives the box $[-1,1] \times [-1,0]$, and the extension we compute gives the box $[-2,2] \times [-1,0]$. If, however, the holes are disjoint, we randomly pick up one of them.

Example 2.

Figure 4:
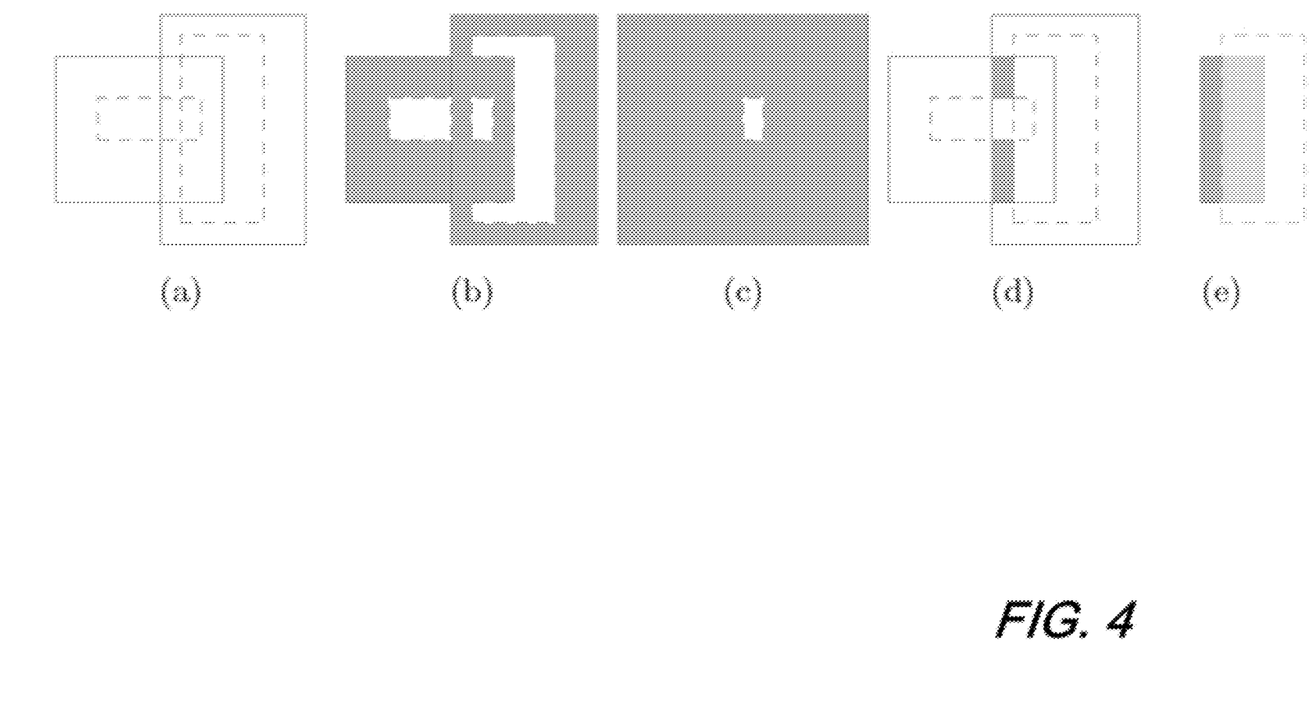
FIG. 4 is a schematic diagram depicting join and meet operators using interval component domains showing (a) two initial abstract objects; (b) concrete union of the objects; (c) abstract object representing $\cup_{1/2}$; (d) the concrete intersection of the objects; and 9e) the abstract object representing $\cap_{1/2}$, according to an aspect of the present disclosure.

Consider 2-dim simple abstract objects. FIG. 4 shows a graphical representation of two overlapping objects. The remaining sub-figures highlight some of the pertinent steps with respect to the computation of $\cup_{1\setminus 2}$ and $\cap_{1\setminus 2}$ for such overlapping objects.

Loop Widening

When processing loop elements in abstract interpretation, we may require widening to guarantee termination of the analysis. For donut domains, we extend the widening operations defined on the component abstract domains. We use the pair-wise definition of widening operators $\nabla$. We thus define widening of donut domains as:

$$(X_1^\#, X_2^\#) \nabla_{1\setminus 2} (Y_1^\#, Y_2^\#) = (X_1^\# \nabla_1 Y_1^\#, X_2^\# \cap_2 Y_2^\#).$$

We use the standard widening operator $\nabla_1$ for abstract domain $\mathcal{A}_1$. Similarly, we use the standard meet operator $\cap_2$ of abstract domain $\mathcal{A}_2$ for the inner region, which ensures the soundness of $\nabla_{1\setminus 2}$. The convergence of the first component is guaranteed by the widening operator $\nabla_1$. The convergence of the second component needs however more attention.

Note that the simple use of narrowing operator of $\mathcal{A}_2$ is unsound as it may give a donut object which is not an upper bound. To ensure the termination we add a parameter k which will encode the maximal number of allowed iterations. If the donut object does not converge within those k iterations, the hole component is reduced to $\perp_2$. Note that the use of the narrowing operator of $\mathcal{A}_2$ instead of $\cap_2$ does not give in general an upper bound of $(X_1^\#, X_2^\#)$ and $(Y_1^\#, Y_2^\#)$.

Interpretation of Tests

The ability to express holes allows us to better handle a wide range of non-convex tests such as the $\neq$ test or the strict inequality test. We start with classical tests. For $\diamond \in \{=, \leq\}$:

$$[\![x_k \diamond 0]\!]^\sharp (X_1^\sharp, X_2^\sharp) \stackrel{def}{=} ([\![x_k \diamond 0]\!]_1^\sharp (X_1^\sharp), [\![x_k \diamond 0]\!]_1^\flat (X_2^\sharp)),$$

where $$[\![\cdot]\!]_2^\flat \stackrel{def}{=} \check{\alpha}_2 \circ [\![\cdot]\!]_2.$$

Such under-approximation is required so that the newly computed (exact) hole can be encoded in $\mathcal{A}_2$. Therefore, if the exact hole fits naturally in $\mathcal{A}_2$ (say we have a linear constraint and $\mathcal{A}_2$ is the Polyhedra domain), there is no need to under-approximate $([\![\cdot]\!]_2^\# = [\![\cdot]\!]_2^\#)$. In Section 3, we detail how we compute such an under-approximation, whenever needed. If no algorithm is available for the under-approximation, we keep the object $X_2^\#$ unchanged, which is sound.

The non-equality test $\neq$ is defined as follows:

$$[\![x_k \neq 0]\!]^\sharp (X_1^\sharp, X_2^\sharp) \stackrel{def}{=} ([\![x_k \neq 0]\!]^\sharp (X_1^\sharp), \check{\alpha}(\gamma_2(X_2^\sharp) \cup [\![x_k = 0]\!] \top_2)).$$

Although $[\![\chi_k \neq 0]\!]^{\#(X_1^\#)}$ is interpreted as the identity function in standard implementations, nothing prevents the use of any available enhancement proposed by the used analyzer. For the hole, we compute the join of the new hole implied by the constraint $x_k \neq 0$ together with the already existing hole $X_2^\#$. If holes $\gamma_2(X_2^\#)$ and $[\![\chi_k = 0]\!] T_2$ do not overlap, we discard $X_2^\#$. In fact, very often (as will be seen in experiments), the hole induced by the constraint $x_k \neq 0$ is mandatory in order to prove the safety of subsequent computations.

Finally, our approach offers, for free, an interesting abstraction of the strict inequality tests. A comparison with Not Necessarily Closed domains is planned as future work.

$$[\![x_k < 0]\!]^\sharp (X_1^\sharp, X_2^\sharp) \stackrel{def}{=} [\![x_k \neq 0]\!]^\sharp \circ [\![x_k \leq 0]\!]^\sharp (X_1^\sharp, X_2^\sharp).$$

Abstract Assignment

We define in this section the abstraction of the assignment transfer function in $\mathcal{A}_1 \setminus \mathcal{A}_2$. We first give an abstraction of the forget transfer function (non-deterministic assignment):

$$[\![x_k \leftarrow ?]\!]_{1\setminus 2}^\sharp (X_1^\sharp, X_2^\sharp) \stackrel{def}{=} (Y_1^\sharp, Y_2^\sharp), \text{ where}$$

$$Y_1^\sharp \stackrel{def}{=} [\![x_k \leftarrow ?]\!]_1^\sharp (X_1^\sharp)$$

$$Y_2^\sharp \stackrel{def}{=} \begin{cases} [\![x_k \leftarrow ?]\!]_2^\sharp (X_2^\sharp) & \text{if } \gamma_1(X_1^\sharp) \cap \gamma_2([\![x_k \leftarrow ?]\!]_2^\sharp (X_2^\sharp)) \subseteq \gamma_2(X_2^\sharp) \\ \perp_2 & \text{otherwise} \end{cases}.$$

For $Y_2^\#$, we basically check whether applying the forget operator to $X_2^\#$ intersects $\gamma_{1\setminus 2}(X_1^\#, X_2^\#)$, by checking if this newly computed hole is included in the original hole, that is $\gamma_2(X_2^\#)$. If yes, $Y_2^\#$ is set to $\perp_2$. For instance, forgetting $x_2$ in $$(X_1^\sharp, X_2^\sharp) \stackrel{def}{=} ([-2, 2] \times [-2, 2], [-1, 1] \times [-\infty, +\infty]) \text{ gives}$$

$$([-2, 2] \times [-\infty, +\infty], [-1, 1] \times [-\infty, +\infty]):$$

since $$[\![x_2 \leftarrow ?]\!]_2^\sharp (X_2^\sharp) = [-1, 1] \times [-\infty, +\infty],$$

$$\gamma_1(X_1^\sharp) \cap \gamma_2([\![x_2 \leftarrow ?]\!]_2^\sharp (X_2^\sharp)) = [-1, 1] \times [-2, 2]$$

which is included in $\gamma_2(X_2^\#)$. Forgetting $x_1$, however, makes $Y_2^\# = \perp_2$.

The assignment could be seen as a sequence of multiple basic, already defined, operations. We distinguish two kind of assignments $x \leftarrow e$, where e is an arithmetic expression: (I) non-invertible assignments, where the old values of x are lost, such as $x \leftarrow c$, $c \in \mathbb{R}$, and (II) invertible assignments, such as $x \leftarrow x+y$. For non-invertible assignment, we have:

$$[\![x_k \leftarrow e]\!]_{1\setminus 2}^\sharp \stackrel{def}{=} [\![x_k = e]\!]_{1\setminus 2}^\sharp \circ [\![x_k \leftarrow ?]\!]_{1\setminus 2}^\sharp.$$

Invertible assignments are defined in a similar manner. It augments first the set of variables by a new fresh variable, say v, then enforces the test v = e, and finally forgets x and (syntactically) renames v to x. Notice that augmenting the set of variables in $\mathcal{A}_1 \setminus \mathcal{A}_2$ makes the newly added variable, v, unconstrained in both components, $X_1^\#$ and $X_2^\#$. We can sup pose that such a variable v already exists, and used whenever we have an invertible assignment; hence, we obtain:

$$[\![x_k \leftarrow e]\!]_{1\backslash 2}^\sharp \stackrel{def}{=} \text{swap}(x_k, v) \text{ in } [\![x_k \leftarrow ?]\!]_{1\backslash 2}^\sharp \circ [\![v = e]\!]_{1\backslash 2}^\sharp.$$

Template-Based Under-Approximations of Polyhedral

Figure 5:
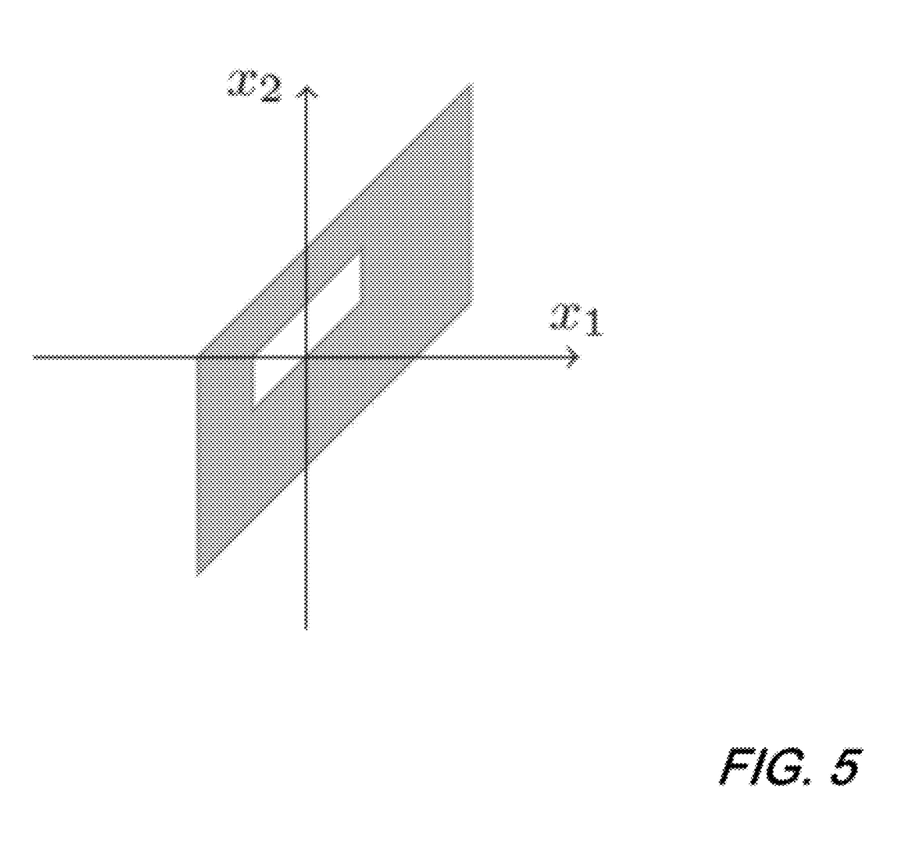
FIG. 5 shows the evaluation of a linear expression $[[x_2 \leftarrow x_1+x_2]]_{1/2}^{\#}$ according to an aspect of the present disclosure.
Figure 6:
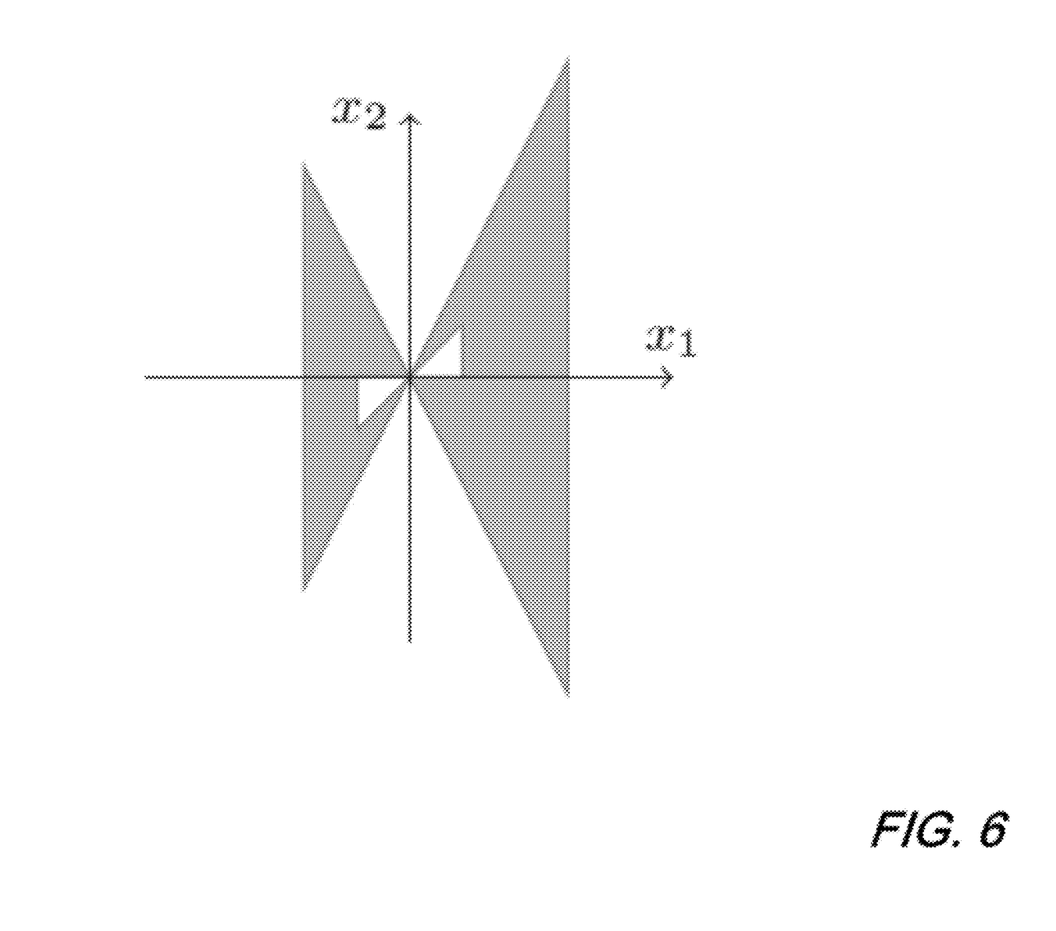
FIG. 6 shows the evaluation of a non-linear expression $[[x_2 \leftarrow x_1 \times x2 1/2\#$ according to an aspect of the present disclosure.

We now develop a new technique to under-approximate holes obtained after linear tests. Holes obtained after non-linear tests are so far reduced to $\perp_2$, which is sound. We plan to improve this as a future work. Consider for instance the object ([−2,3]×[−2,2], [−1,1]×[0,1]). FIG. 5 depicts the exact evaluation of a linear assignment. If we use boxes to encode holes, we need to compute a box inside the white polytope. In FIG. 6, an under-approximation is needed for all convex domains, whereas a non-convex domain such as Interval Polyhedra can express exactly this kind of pattern.

The problem can be seen as follows: given a polyhedron $\mathcal{P}$, we seek to compute a maximal (in a sense to define) inner polyhedron $\mathcal{T}$ (could be boxes, zones, octagons, linear-templates, etc. depending on $\mathcal{A}_2$), which obeys the template pattern matrix T.

Let $\mathcal{P} = \{x \in \mathbb{R} \mid Ax \leq b\}$ be a non-empty polyhedron, where A is a known m×p matrix, b a known vector of $\mathbb{R}^m$, and x a vector of $\mathbb{R}^p$. The inner polyhedron $\mathcal{T}$ is expressed in a similar manner: $\mathcal{T} = \{x \in \mathbb{R}^p \mid Tx \leq c\}$, where T is a known n×p matrix, and c and x are unknown vectors within $\mathbb{R}^n$ and $\mathbb{R}^p$, respectively. The inclusion $\mathcal{T} \subseteq \mathcal{P}$ holds if and only if $\exists c \in \mathbb{R}^n$, such that $\mathcal{T}$ is consistent, and $\forall x \in \mathbb{R}^p$:
Tx≤cAx≤b.

The consistency of $\mathcal{T}$ (that is the system admits a solution in $\mathbb{R}^p$) discards the trivial (and unwanted) cases where the polyhedron $\mathcal{T}$ is empty. For the non-trivial cases, the existence of the vector c and the characterization of the set of its possible values are given by Proposition 3.

Proposition 3. Let $\mathcal{C}$ be the set of c such that $\mathcal{T}$ is consistent. There exists a vector $c \in \mathcal{C}$ such that $\mathcal{T} \subseteq \mathcal{P}$ if and only if there exists an n×m matrix $\Lambda$, such that $\lambda_{i,j}$, the elements of the matrix $\Lambda$, are non-negative and $\Lambda T = A$. For a given possible $\Lambda$, the set $c_\Lambda \subseteq \mathcal{C}$ is characterized by $\{c \in \mathbb{R}^n \mid \Lambda c \leq b\}$.

Proof. Let x denote a vector of $\mathbb{R}^p$, and b denote a known vector of $\mathbb{R}^m$. Let A and T be two known matrices with p columns and m and n rows, respectively. Suppose that c is such that $\mathcal{T}$ is consistent. Therefore, we can assume that $\langle t_i, x \rangle \leq c_i, 1 \leq i \leq n$, where $t_i$ denotes the ith row of the matrix T, is consistent. For a fixed j, $1 \leq j \leq m$, the inequality $\langle a_j, x \rangle \leq b_j$, is then a consequence of the system Tx≤c if and only if there exist non-negative real numbers $\lambda_{i,j}$, $1 \leq i \leq n$, such that $$\sum_{i=1}^{n} \lambda_{i,j} t_i = a_j \text{ and } \sum_{i=1}^{n} \lambda_{i,j} c_i \leq b_j.$$

The previous claim of the existence of the non-negative $\lambda_{i,j}$ is a generalization of the classical Farkas' Lemma. The matrix $\Lambda$ is then constructed column by column using the elements $\lambda_{i,j}$, $1 \leq i \leq n$ for the j th column. Of course, by construction, such a $\Lambda$ has non-negative elements, and satisfies $\Lambda T = A$, and $\Lambda c \leq b$.

On the other hand, if such a matrix exists, and the set $\{c \in \mathbb{R}^n \mid \Lambda c \leq b\}$ is not empty, we have by the fact that $\Lambda$ has non-negative elements $Tx \leq c \Longrightarrow \Lambda Tx \leq \Lambda c$.

Therefore, $\Lambda T = A$ and $\Lambda c \leq b$, gives Ax≤b.

On the Consistency of Tx≤c.

It not obvious in general, given a matrix T, to characterize the set of c such that $\mathcal{T}$ is consistent. However, given a vector c, we can efficiently check whether the system is consistent or not using its dual form and a LP solver. Indeed, the system Tx≤c is inconsistent if and only if there exists a non-negative vector $\lambda \in \mathbb{R}^n$ such that $T^t \lambda = 0$ and $\langle \lambda, c \rangle < 0$, where $T^t$ denotes the transpose of T. Therefore, given a vector c, if the objective value of the following problem:

$$\min \langle \lambda, c \rangle \text{ s.t. } T^t\lambda = 0 \qquad (2)$$

is non-negative, the system is consistent. Observe that, for simple patterns such as boxes, the characterization of the set of c that makes the system consistent is immediate.

Computing $\Lambda$.

The matrix $\Lambda$ is built column by column. Let us denote by $\lambda_{-,j} \in \mathbb{R}^n$ the jth column of $\Lambda$, by $a_j \in \mathbb{R}^p$, $1 \leq j \leq m$, the jth row of A, by $b_j \in \mathbb{R}$ the jth component of b, and by $t_i \in \mathbb{R}^p$, $1 \leq i \leq m$, the ith row of T. The vector $\lambda_{-,j}$ satisfies $\sum_{i=1}^{n} \lambda_{i,j} t_i = a_j$. To each feasible $\lambda_{-,j}$ corresponds a pattern $$\mathcal{P}_{\lambda_{-,j}} := \left\{ x \in \mathbb{R}^p \mid \bigwedge_{\lambda_{i,j} > 0} \langle t_i, x \rangle \leq 0 \right\},$$

which is included in the affine subspace $$\mathcal{P}_j \stackrel{def}{=} \{x \in \mathbb{R}^p \mid \langle \alpha_j, x \rangle \leq 0\}.$$

The maximal pattern (with respect to set inclusion) corresponds to $\bar{\lambda}$ defined as the solution of the following linear program.

$$\min \sum_{i=1}^{n} \lambda_{i,j} \|t_i\| \qquad (3)$$

$$\text{s.t. } \sum_{i=1}^{n} \lambda_{i,j} t_i = a_j$$

$$\forall \, 0 \leq i \leq n, \lambda_{i,j} \geq 0$$

Therefore, computing $\Lambda$ needs solving p instances of the LP (3).

Computing c.

We have already established (Proposition 3) that the vector c verifies $\Lambda c \leq b$. Since $\Lambda$ is known, any feasible c (that is such that $\Lambda c \leq b$) that makes the system Tx≤c consistent (the objective value of the LP (2) is non-negative) gives an under-approximation of $\mathcal{P}$ that respects our initial template T. Of course, it is immediate to see that the set of c that lies on the boundaries of the feasible region (that is by making $\Lambda c = b$) gives, in general, a "better" under-approximation than the strict feasible solutions since the saturation makes some of the facets of the inner pattern ($\mathcal{T}$) included in those of the under-approximated polyhedron $\mathcal{P}$. Moreover, in some cases, the saturation gives a unique consistent solution for c. For instance, when we under-approximate a shape $\mathcal{P}$ which respects already the pattern $\mathcal{T}$, c is uniquely determined and gives actually b using our technique. In other words, under-approximating an octagon (for instance) with an octagonal pattern gives exactly the first octagon.

Implementation

We have implemented donut domains on top of the known APRON library. The domains $\mathcal{A}_1$ and $\mathcal{A}_2$ are parameters of the analysis and can be specified by the user among already existing APRON domains. The current version uses an enhanced implementation of the set-theoretic operators, mainly based on already existing routines of the underlying abstract domains, as described earlier, and relies on $\breve{\cup}_{fb}$ and $\breve{\cap}_{fb}$ as fallback operators. This very simple approach allows to build the donut domain without additional effort on top of already existing domains. The analyzed examples (see Table 1) use mainly the absolute value function to avoid the division by zero (widely used technique). The motiv example is the motivating example with its two branches. The gpc code is extracted from the Generic Polygon Clipper project. The examples xcor, goc and x2 are extracted from a geometric object contact detection library.

Division-by-Zero Analysis Results

TABLE 1

| | WCfS | boxes (hole) | false alarms |
|---|---|---|---|
| motiv(if) | dy ≠ 0 | dy = 0 | 0 |
| motiv(else) | dx ≠ 0 | dx = 0 | 0 |
| gpc | den ≠ 0 | den ∈ [−0.1, 0.1] | 0 |
| goc | d ≠ 0 | d ∈ [−0.09, 0.09] | 0 |
| x2 | Dx ≠ 0 | Dx = 0 | 0 |
| xcor | usemax ≠ 0 | usemax ∈ [1, 10] | 1 |

The WCfS column (above) indicates the weakest condition that we need to infer to prove the safety of the program. Whenever the negation of this condition is verified by (included in) the donut hole, the program is proved to be safe. The third column shows the inferred donut holes when using a non-relational domain (boxes) to encode holes. As Table 1 shows, our approach permits to catch almost all division-by-zero false positives that classical domains (even non-convex) fail to prove. Here, the use of boxes is sufficient to eliminate almost all false alarms here. In the last example, among the two possible holes, namely usemax ∈ [1,10] and usemax ∈ {0}, we choose by default the one created immediately after the test (usemax>10 or usemax<1). Here the safety property can not be proved with this hole and relies on an earlier (disjoint) hole created by a former test, namely usemax ∈ {0}. We could also choose systematically (as a heuristic) the hole that contains "zero", which is sufficient here to discard the remaining false alarm. Such a property-driven hole behavior would be an interesting direction for future research.

The proof of the motivating example is really challenging as it requires to handle both the hole that comes from the full-zero-test, together with strict inequality tests and the over-approximation that comes from the join operation. Our technique that consists of relaxing the hole in a convex way before using the fallback operator works here and is able to prove that in both branches the division is safe. In goc example, we can see one interesting ability of donuts domain: when we compute a convex join of two non-overlapping objects, the hole in between is directly captured which permits a better precision. Finally, example x2 needs a precise interpretation of strict inequalities.

Under-Approximation.

Figure 7:
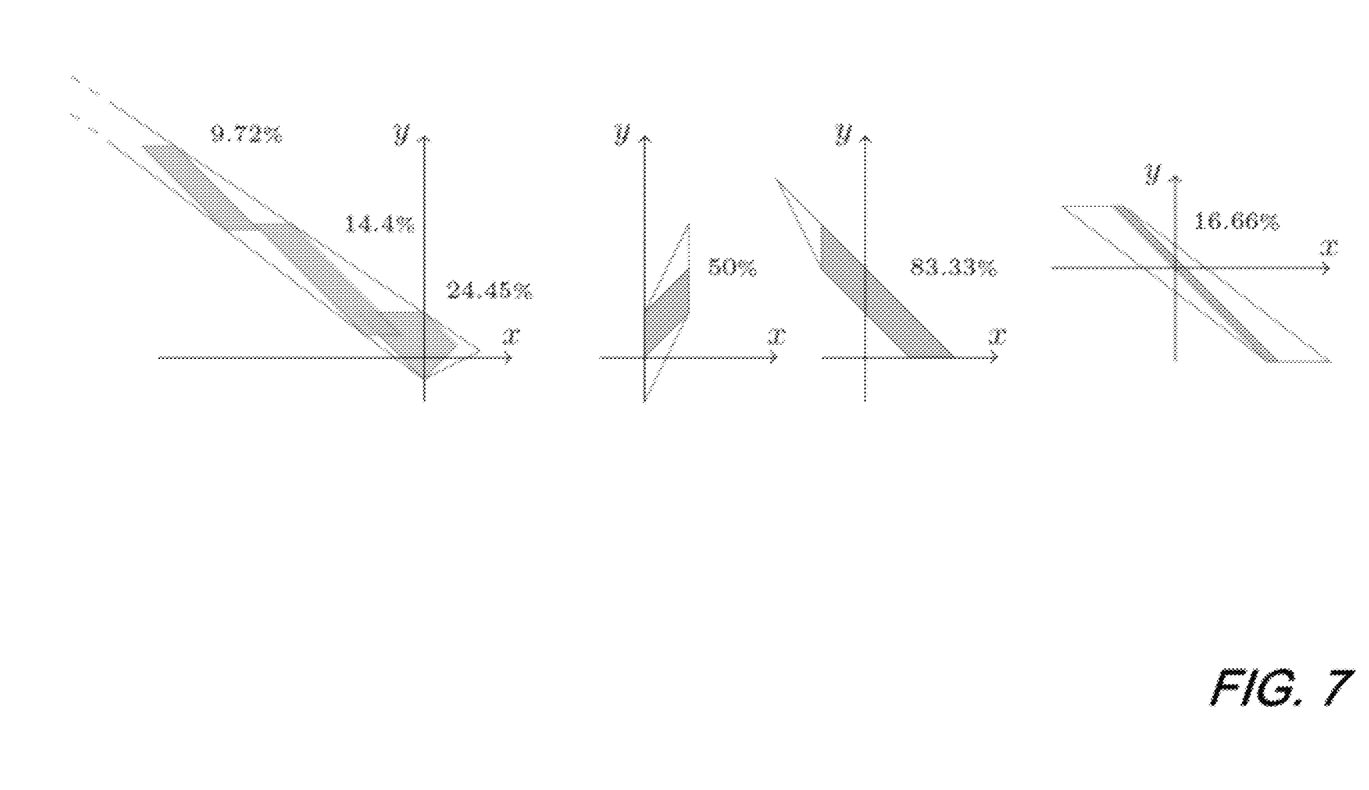
FIG. 7 shows the under-approximation of randomly generated polyhedral with octagons according to an aspect of the present disclosure.

We have implemented our technique of Section 3 using the GLPK solver. Some experiments, obtained for randomly generated polyhedra with octagonal template, are shown in FIG. 7. Although all shown polyhedra are bounded, our technique works perfectly well for unbounded shapes. The rate of volume, $$\frac{volT}{volP},$$

is used as a metric for the quality of the under-approximation (shown near each pattern in FIG. 7).

All obtained octagons are maximal with respect to set inclusion. It is not clear which choice among many (see the left graph), is the best. Indeed, such a choice depends on the future computations and the properties one would like to prove.

Figure 8:
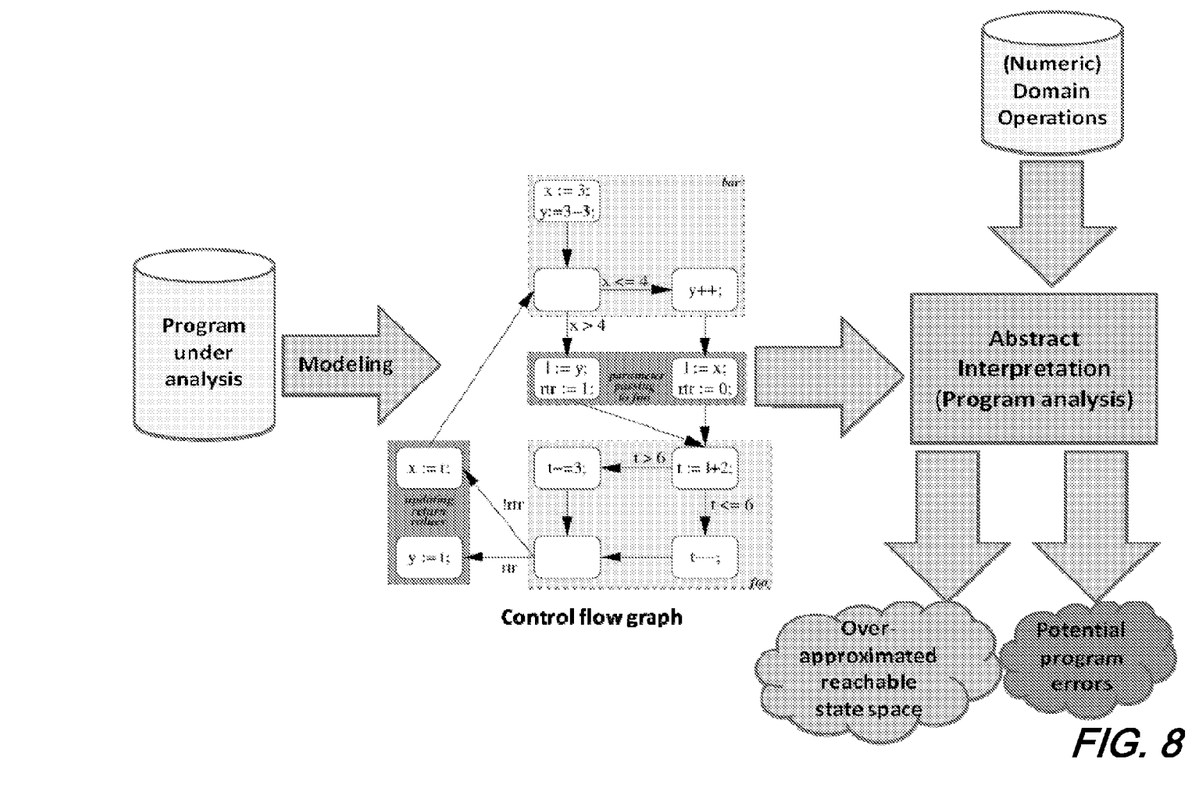
FIG. 8 is a schematic block diagram depicting a high-level depiction of abstract interpretation based upon program analysis according to an aspect of the present disclosure.

With reference now to FIG. 8, there is shown a schematic block diagram depicting an overview of abstract interpretation applicable to and according to an aspect of the present disclosure. As depicted there, a program under analysis is modeled and an abstract interpretation program analysis is performed. As those skilled in the art now readily appreciate, such abstract interpretation computes an over-approximation of reachable states. Stated alternatively, it computes an over-approximated set of those states that may be reached when the program is executed. Of course, even an over-approximation may be useful to highlight potential errors in the program, such as a null-pointer, buffer overruns, division-by-zero, etc.

While not specifically shown in FIG. 8, to realize an efficient computation, abstraction interpretation generally utilizes computations in convex domains such as intervals, octagons, or polyhedra to compute this over-approximation of the reachable states.

Figure 9:
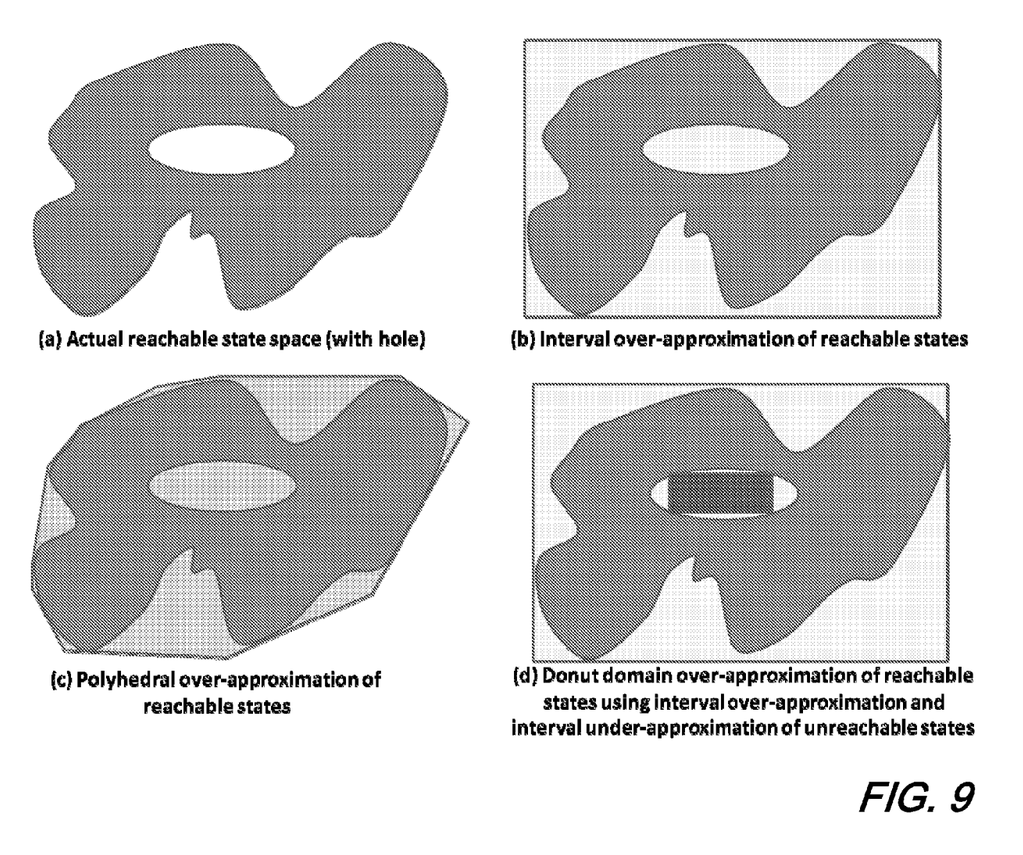
FIG. 9 is a schematic block diagram depicting several exemplary operations performed on donut domains according to an aspect of the present disclosure.

However, and as may be appreciated by those skilled in the art, certain properties of interest sometimes require reasoning over non-convex regions of reachable states. Turning now to FIG. 9, there is shown a schematic which is useful to illustrate certain aspects of the analysis according to the present disclosure.

Notably, sub-figure (a) shows an actual reachable state space as a solid shade. Note that the reachable state space excludes a particular inner unshaded region (maybe an ϵ-ball around 0 to avoid division-by-zero, for example).

Sub-figure (b) shows an over-approximation of reachable state space as computed by the interval domain (depicted as region in box). Note that the inner region (hole) is within the box and therefore treated as reachable.

Sub-figure (c) shows a more precise over-approximation (that is, the over-approximation is tighter), using the polyhedral domain (depicted within polyhedria). However, even here, the inner region (hole) is regarded as reachable.

Sub-figure (d) highlights one particular incarnation of donut domains according to an aspect of the present disclosure. In particular, it shows an example where both $D_1$ and $D_2$ are the interval domain. Notably, we have under-approximateed the inner region (hole) of unreachable states (rectangle in center circle). This allows us to potentially prove the division by 0 as safe, as long as the under-approximation includes 0. Similar to the degree of precision allowed in defining an over-approximation using different domains, we can also trade-off precision of the under-approximation by choosing various domains for the inner region of unreachable states.

In summary, our method over-approximates reachable states, and under approximates unreachable states. Advantageously, we have defined and described a generic donut domain template that can be instantiated appropriately with various domains.

Figure 10:
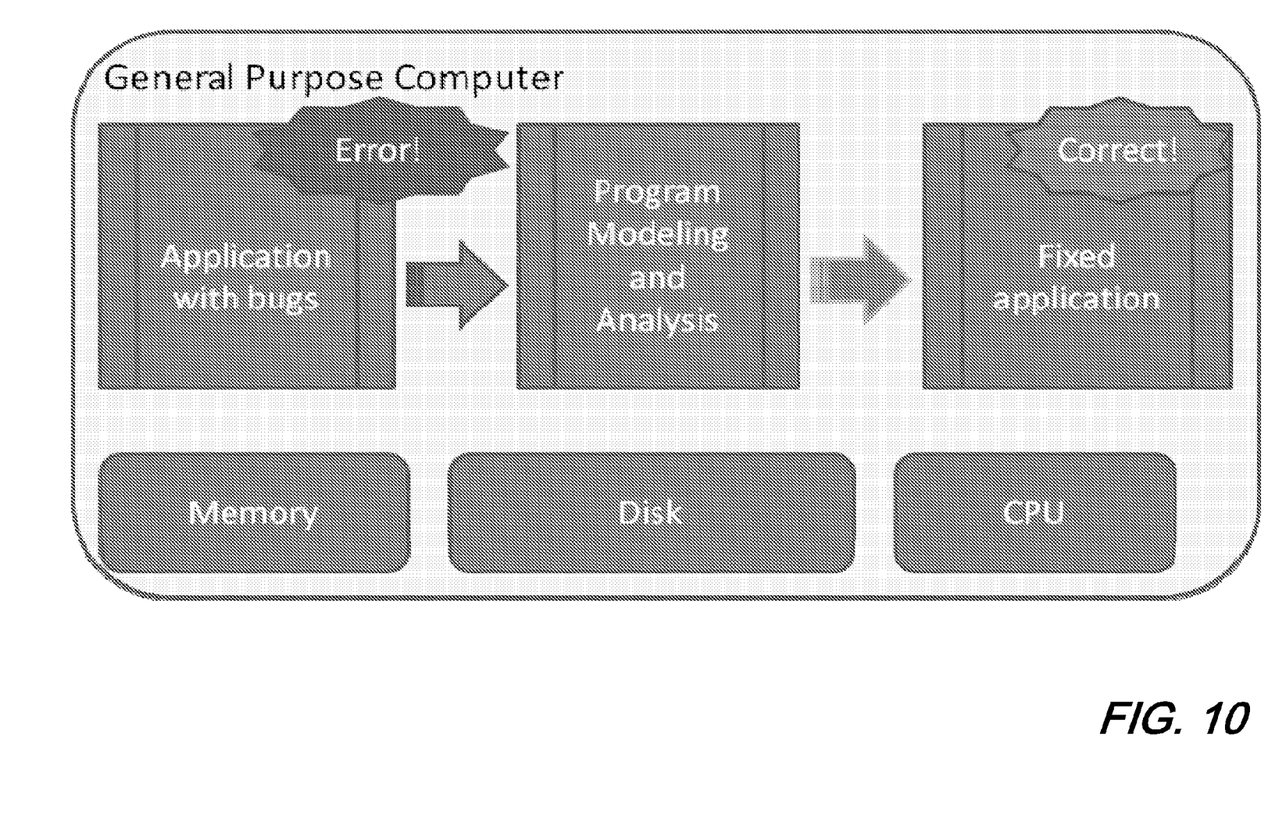
FIG. 10 shows a block diagram of an exemplary computer system on which methods according to the present disclosure may be implemented.

FIG. 10 is a schematic block diagram illustrating an exemplary computer system that when so programmed may execute instructions for performing methods according to aspects of the present disclosure.

Conclusions and Future Work

The donut domains can be viewed as an effort to make some Boolean structure in the underlying concrete space visible at the level of abstract domains as a "set-minus" operator. This allows optimization of the related abstract operators (such as meet and join) to take full advantage of its semantics in terms of excluded states. While powerset domains allow handling non-convex sets, this comes at significant cost. In practice, the full expressiveness may not be needed. We exploit the set-minus operator, which is quite versatile in capturing many problems of interest—division by zero, instability regions in numeric computations, sets excluded by contracts in a modular setting, etc. In the future, we wish to expand the experiments performed using donut domains. Furthermore, other non-convexity issues may be addressed by trying to combine the work on LDDs with insights gained here to allow handling many holes in an efficient manner. Accordingly, the disclosure should be viewed as limited only by the scope of the claims that follow.

The invention claimed is:

1. A computer implemented method for computer program analysis comprising the steps of:
   generating an outer convex region of all reachable states for the computer program wherein the outer region (D1) represents an over-approximation of all of the reachable states;
   generating an inner convex region of all unreachable states for the computer program wherein the inner region (D2) represents an under-approximation of all of the unreachable states; and
   generating a set of possible program errors using abstract interpretation over the difference between the two regions.

2. The computer implemented method of claim 1 wherein the under-approximated inner region is instantiated as a powerset domain of an elementary domain.

3. The computer implemented method of claim 1 further comprising the steps of:
   constructing a control flow graph of the computer program; propagating region D1 along the control flow graph; propagating region D2 along the control flow graph; determining the differences between the two propagations; and generating a set of reachable states from the difference so determined.

4. The method of claim 3 wherein said regions are ones selected from the group consisting of: intervals, octagons, and polyhedron.

5. The method of claim 4 wherein domains are combined for abstract interpretation and said combination is performed according to an operation selected from the group consisting of: join, meet, widening, update functions, and interpretation of tests.

6. The method of claim 1 further comprising the steps of:
   determining a maximal inner polyhedron $\tau=\{x \in R^P | Tx \leq c$ of a given
   template matrix T that lies within a given non-empty polyhedron $P=[x \in R^P | Ax \leq b]$, by:
      computing an auxiliary matrix $\Lambda$ with non-negative elements $\Lambda T=A$,
      computing c such that $\Lambda c \leq b$ and $Tx \leq c$ is consistent, and outputting such inner polyhedron $\tau$.

7. The method of claim 1 further comprising the step of using an LP-solver to find matrix $\Lambda$.

8. The method of claim 7 further comprising the step of determining the saturation of $\Lambda c \leq b$, namely $\Lambda c = b$.

9. The method of claim 8 wherein the output polyhedron is used for computer program analysis.

10. A computer implemented method for determining a maximal inner polyhedron $\tau=\{x \in R^P | Tx \leq c$ of a given
    template matrix T that lies within a given non-empty polyhedron $P=[x \in R^P | Ax \leq b]$, comprising the steps of:
       computing an auxiliary matrix $\Lambda$ with non-negative elements $\Lambda T=A$,
       computing c such that $\Lambda c \leq b$ and $Tx \leq c$ is consistent, and outputting such inner polyhedron $\tau$.

11. The method of claim 10 further comprising the step of using an LP-solver to find Matrix $\Lambda$.

12. The method of claim 10 further comprising the step of determining the saturation of $\Lambda c \leq b$, namely $\Lambda c = b$.

13. The method of claim 10 wherein the output polyhedron is used for computer program analysis.

14. The method of claim 10 wherein the output polyhedron is used for test vector generation.

15. The method of claim 10 wherein the output polyhedron is used for computer graphics applications.

* * * * *